US009693365B2

United States Patent
Sawamoto et al.

(10) Patent No.: US 9,693,365 B2
(45) Date of Patent: Jun. 27, 2017

(54) COMMUNICATION CONTROL APPARATUS, BASE STATION APPARATUS, AND COMMUNICATION CONTROL METHOD

(71) Applicant: FUJITSU LIMITED, Kawasaki-shi, Kanagawa (JP)

(72) Inventors: Toshiro Sawamoto, Yokohama (JP); Dai Kimura, Yokohama (JP); Takaharu Kobayashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 14/737,929

(22) Filed: Jun. 12, 2015

(65) Prior Publication Data

US 2015/0282194 A1    Oct. 1, 2015

Related U.S. Application Data

(63) Continuation of application No. PCT/JP2012/082471, filed on Dec. 14, 2012.

(51) Int. Cl.
    H04W 72/08    (2009.01)
    H04W 48/16    (2009.01)
    H04W 24/02    (2009.01)

(52) U.S. Cl.
    CPC ......... *H04W 72/082* (2013.01); *H04W 24/02* (2013.01); *H04W 48/16* (2013.01)

(58) Field of Classification Search
    None
    See application file for complete search history.

(56) References Cited

U.S. PATENT DOCUMENTS

| 9,294,160 B2* | 3/2016 | Hou ................. H04B 7/024 |
| 2010/0009710 A1* | 1/2010 | Zhang .............. H04W 52/281 |
| | | 455/522 |
| 2010/0136994 A1 | 6/2010 | Kim et al. |

(Continued)

FOREIGN PATENT DOCUMENTS

| JP | 2011-71993 | 4/2011 |
| JP | 2011-142516 | 7/2011 |

(Continued)

OTHER PUBLICATIONS

International Search Report and Written Opinion of the International Searching Authority (Form PCT/ISA/210, Form PCT/ISA/237), mailed in connection with PCT/JP2012/082471 and mailed Mar. 12, 2013 (8 pages).

(Continued)

*Primary Examiner* — Hong Cho
(74) *Attorney, Agent, or Firm* — Fujitsu Patent Center

(57) ABSTRACT

A communication control apparatus including a processor is provided. The processor is configured to calculate a first predicted communication quality of a mobile station apparatus in a state not including an interference signal from one or more cells among surrounding cells in accordance with measurement results of a quality of reception of a signal from a serving cell and strength of interference signals from the surrounding cells as measured by the mobile station apparatus, and judge permission for transmission of signals by the one or more cells in a radio resource of communication of the mobile station apparatus based on the first predicted communication quality.

11 Claims, 10 Drawing Sheets

(56) References Cited

U.S. PATENT DOCUMENTS

| | | | |
|---|---|---|---|
| 2011/0034192 A1* | 2/2011 | Lim | H04B 7/0417 |
| | | | 455/501 |
| 2011/0085460 A1* | 4/2011 | Zhang | H04W 56/005 |
| | | | 370/252 |
| 2011/0207487 A1 | 8/2011 | Yang et al. | |
| 2012/0208599 A1 | 8/2012 | Tanaka | |
| 2012/0263068 A1 | 10/2012 | Morimoto et al. | |

FOREIGN PATENT DOCUMENTS

| | | |
|---|---|---|
| JP | 2012-507216 | 3/2012 |
| JP | 2012-510771 | 5/2012 |
| JP | 2012-209679 | 10/2012 |
| WO | 2011/029458 | 3/2011 |
| WO | 2011/033556 | 3/2011 |
| WO | 2011/052067 | 5/2011 |

OTHER PUBLICATIONS

JPOA—Notice of Reasons for Rejection mailed on Aug. 9, 2016 for Japanese Patent Application No. 2014-551815 with partial English translation.

* cited by examiner

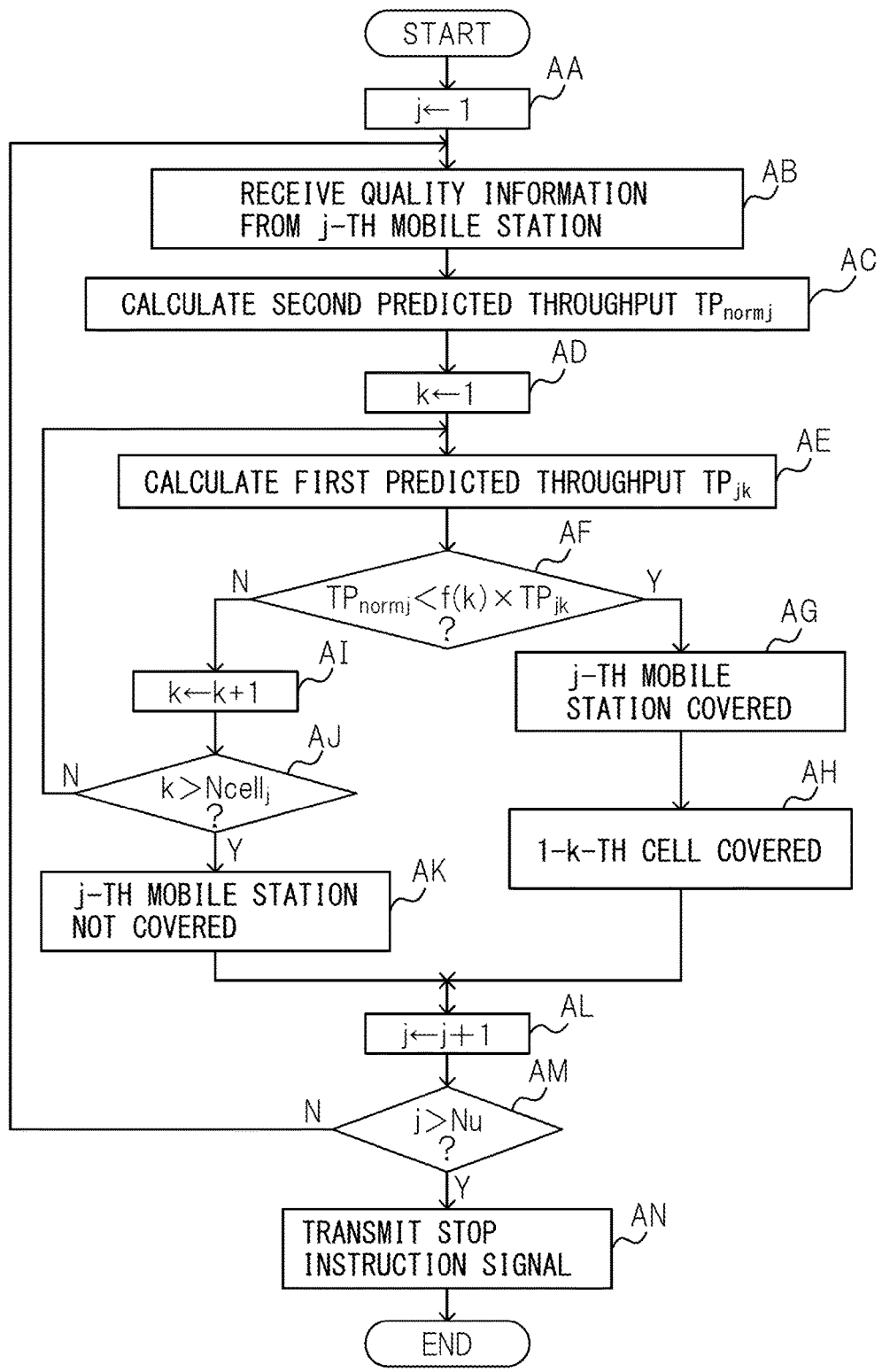

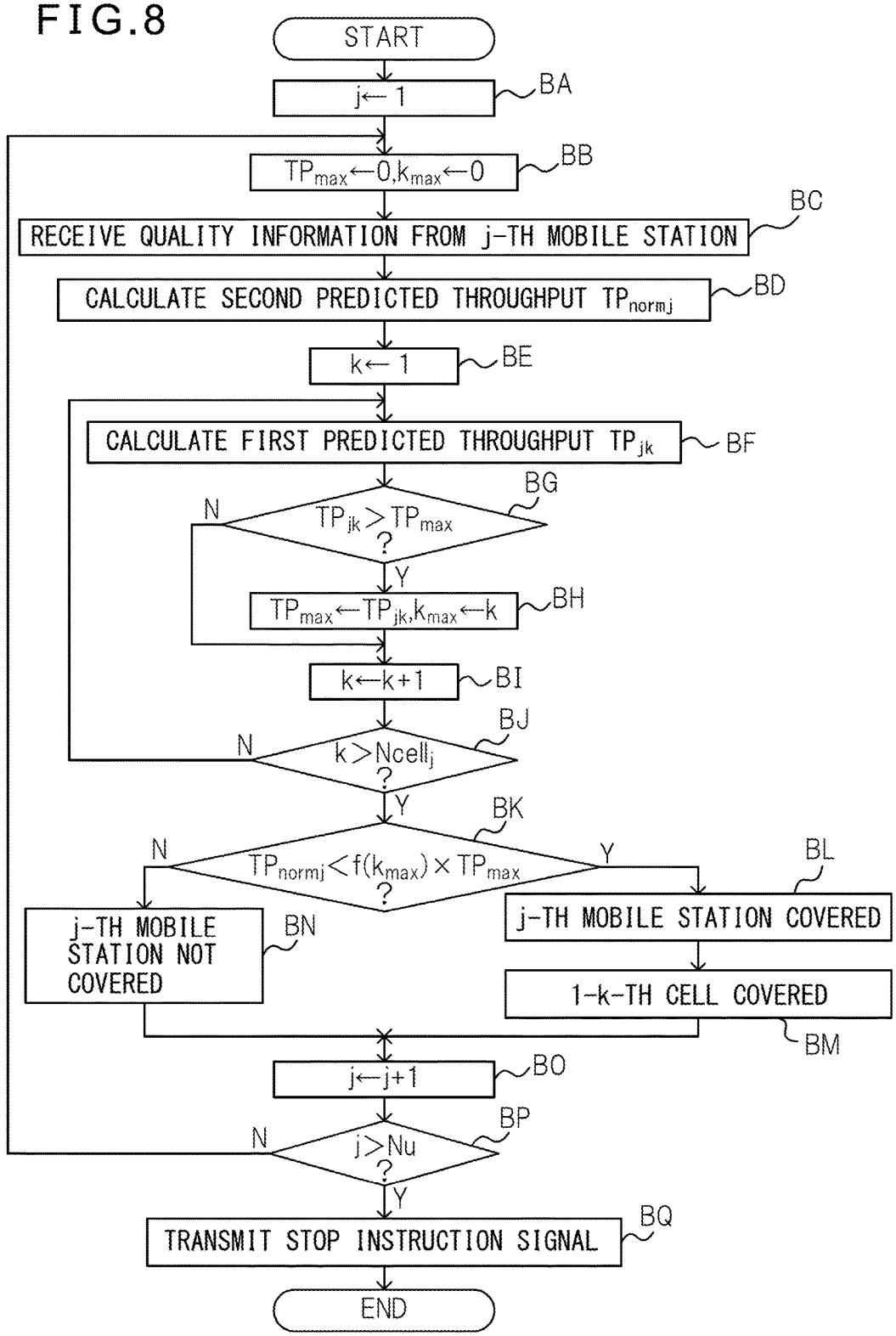

COMMUNICATION CONTROL APPARATUS, BASE STATION APPARATUS, AND COMMUNICATION CONTROL METHOD

CROSS-REFERENCE TO RELATED APPLICATION

This application is a continuation application PCT/JP2012/082471,, filed on Dec. 14, 2012, and designated the U.S., the entire contents of which are incorporated herein by reference.

FIELD

The embodiments discussed herein relate to a communication control apparatus and communication control method.

BACKGROUND

A communication technology for transmitting wireless signals to a same mobile station apparatus by coordination of a plurality of cells so as to improve the quality of communication has been known. One example of such a communication technology is "coordinated multi-point transmission (CoMP)" which is studied in the LTE (Long Term Evolution)-Advanced for which standards are in the process of being formulated by the 3GPP (3rd Generation Partnership Project).

As related art, a mobile terminal cluster-based coordinated communication system (for example, see Japanese National Publication of International Patent Publication No. 2012-510771) is known. This coordinated communication method includes a stage of receiving an allocation of a resource of a weighted sub-band which is mapped on a coordinated base station cluster, one type of the coordinated base station clusters which are set in advance, which has a group including a serving base station of a mobile terminal and base stations giving dominating interference to the mobile terminal which are found by channel estimation and a stage of communicating with the serving base station in coordination with the base stations giving dominating interference to the mobile terminal.

Further, there is known the art of switching the type of coordination in coordinated multi-sector communication (for example, see Japanese National Publication of International Patent Publication No. 2012-507216). The base station equipment which governs a sector determines one or more coordinating sectors of a mobile terminal and, in accordance with rules defined in advance, uses the information of the one or more coordinating sectors as the basis to determine the type of coordinate multi-sector communication which is provided in coordination with the one or more coordinating sectors and provides coordinated multi-sector communication of the corresponding determined type to the mobile terminal in coordination with the one or more coordinating sectors.

Further, there is known a mobile terminal apparatus which receives downlink signals which include reference signals from a plurality of wireless base station apparatuses relating to downlink CoMP and transmits feedback information which includes results of measurement of channel quality to the plurality of wireless base station apparatuses (for example, see Japanese Laid-Open Patent Publication No. 2012-510771, No. 2012-507216). The wireless base station apparatuses receive uplink signals which include the results of measurement of channel qualities of the plurality of wireless base stations relating to downlink CoMP and cell information relating to wireless base station apparatuses with average reception levels within a first threshold range and when there are wireless base station apparatuses with differences from the average reception level within a second threshold range among the wireless base station apparatuses with average reception levels within the first threshold range, control the transmission powers to the two groups of wireless base station apparatuses.

SUMMARY

According to one aspect of the apparatus, there is provided a communication control apparatus including a processor. The processor is configured to calculate a first predicted communication quality of a mobile station apparatus in a state not including an interference signal from one or more cells among surrounding cells in accordance with measurement results of a quality of reception of a signal from a serving cell and strength of interference signals from the surrounding cells as measured by the mobile station apparatus, and judge permission for transmission of signals by the one or more cells in a radio resource of communication of the mobile station apparatus based on the first predicted communication quality.

The objects and advantages of the invention will be realized and attained by means of the elements and combinations particularly pointed out in the appended claims. It is to be understood that both the foregoing general description and the following detailed description are exemplary and explanatory only and are not restrictive of the invention.

BRIEF DESCRIPTION OF DRAWINGS

FIG. 7 is an explanatory view of a first example of the operation of the base station apparatus.

FIG. 8 is an explanatory view of a second example of the operation of the base station apparatus.

FIG. 9A is an explanatory view of one example of a hardware configuration of a base station apparatus, while

DESCRIPTION OF EMBODIMENTS

1. Configuration of Communication System

Figure 1:
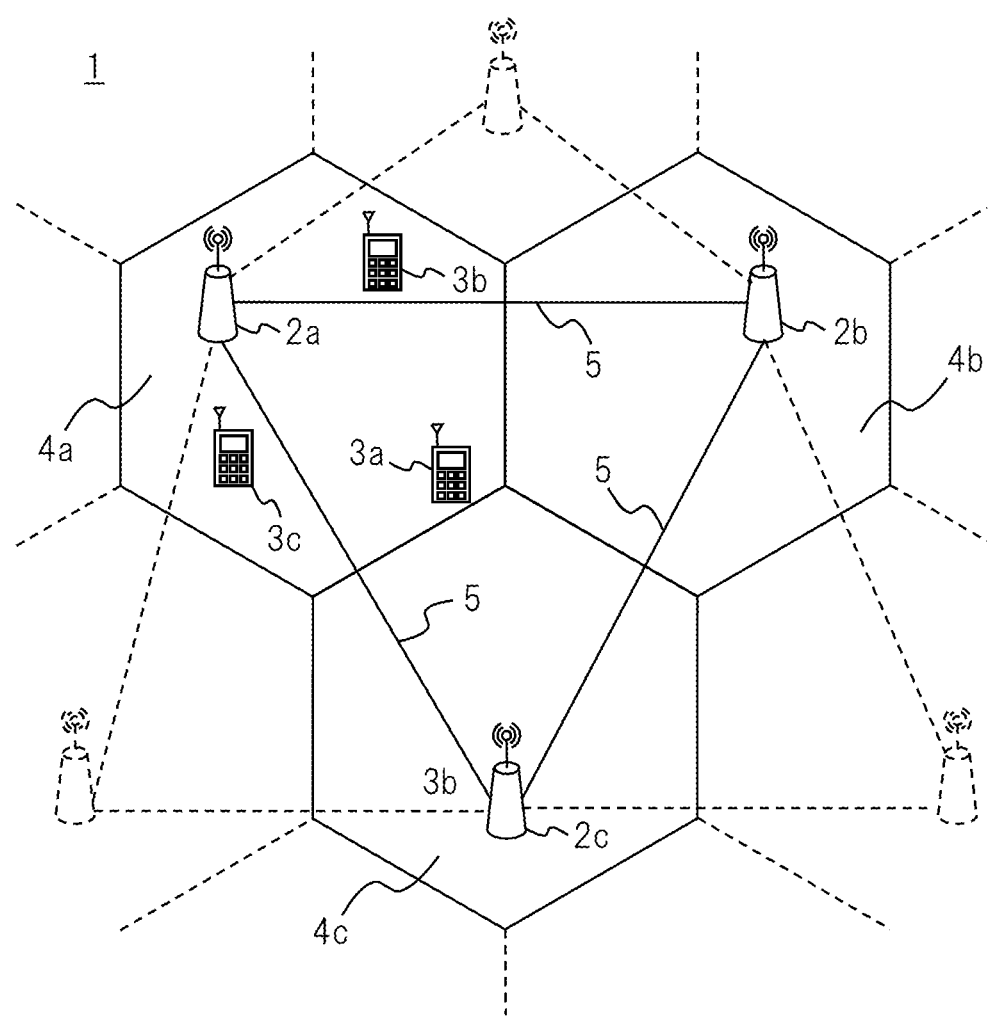
FIG. 1 is an explanatory view of an embodiment of a communication system.

Below, referring to the attached drawings, preferable embodiments will be explained. FIG. 1 is an explanatory view of an example of the configuration of a communication system. The communication system 1 is comprised of base station apparatuses 2a, to 2c, and mobile station apparatuses 3a, to 3c. In the following explanation and drawings, the base station apparatuses and mobile station apparatuses will sometimes respectively be referred to as the "base stations" and "mobile stations". Further, the base stations 2a, to 2c will sometimes be referred to all together as the "base stations 2", while the mobile stations 3a, to 3c, will sometimes be referred to as the "mobile stations 3".

The base stations 2 are wireless communication apparatuses which wirelessly connect with the mobile stations 3. Reference numerals 4a, to 4c, indicate cells in the wireless communication areas which are formed by the base stations 2a, to 2c. In the following explanation and drawings, the cells 4a, to 4c, will sometimes be referred to all together as the "cells 4". The base stations 2 can provide various services such as voice communication or video distribution to mobile stations 3 in one or more cells 4. The base stations 2 are connected with other base stations by wired connections 5, for example, using optical transmission to send and receive various information with other base stations 2.

The following explanation uses the example of the case where the communication system 1 is a system based on the LTE. However, the example does not intend that the communication system which is described in this Description be applied limited only to a communication system based on the LTE. The communication system which is explained in the Description may be widely applied in communication systems which determine the allocation of wireless resources in downlink communication in accordance with the wireless communication quality which is measured by a mobile station.

Figure 2:
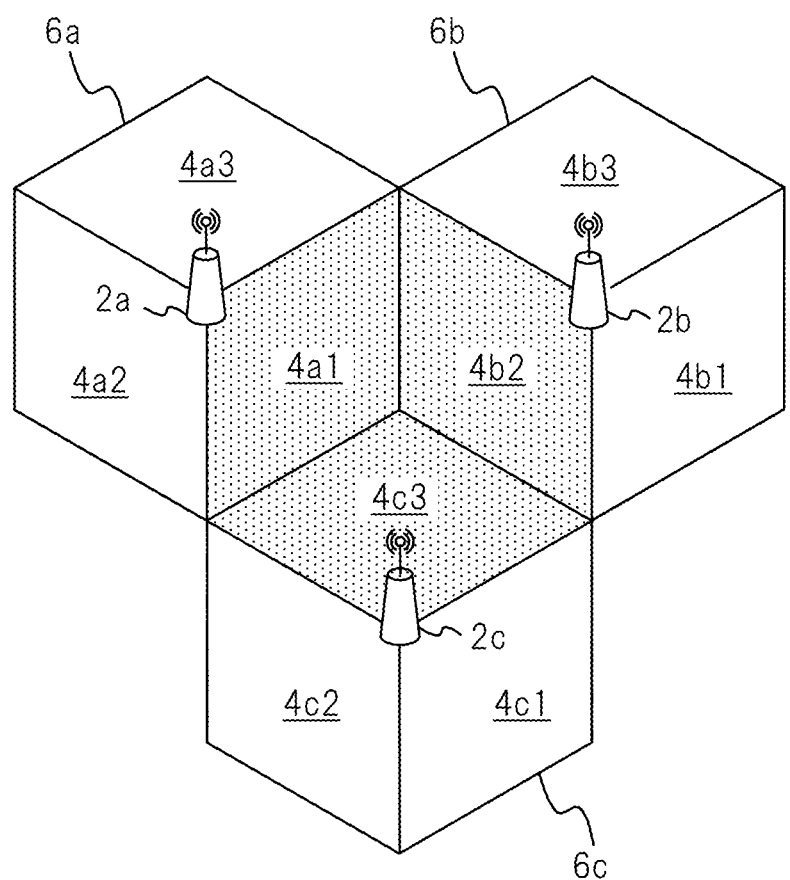
FIG. 2 is an explanatory of view of a first example of another embodiment of cells.

FIG. 2 is an explanatory view of a first example of another embodiment of cells. Reference notations 6a, to 6c, are wireless communication areas of base stations 2a, to 2c, which are formed by base stations 2a, to 3c. The wireless communication area 6a, is divided by a directional antenna of the base station 2a, into a plurality of sector cells 4a1 to 4a3. The wireless communication area 6b, is similarly divided into a plurality of sector cells 4b1 to 4b3, while the wireless communication area 6c, is similarly divided into a plurality of sector cells 4c1 to 4c3. The term "cell" includes such sector cells.

Figure 3:
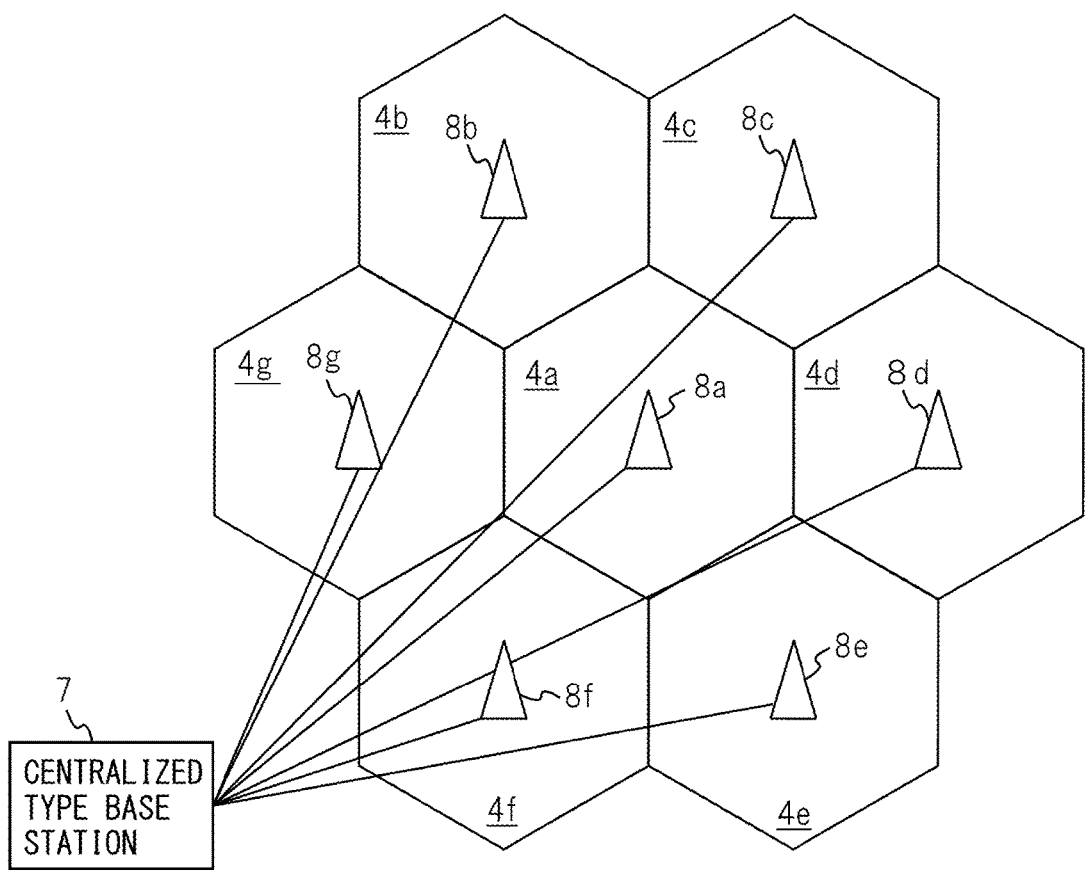
FIG. 3 is an explanatory view of a second example of another embodiment of cells.

FIG. 3 is an explanatory view of a second example of another embodiment of cells. The RREs 8a, to 8g are remote radio equipment comprised of antennas and wireless parts of wireless base station apparatuses made independent and form the cells 9a, to 9g. The RREs 8a, to 8g, are connected through optical transmission or other high speed interfaces to a centralized type base station 7 which handles baseband signal processing or scheduling. The term "cell" includes cells which are formed by RREs.

2. Summary of Operation

The communication control operation in the communication system 1 will be explained next. Now, assume that the mobile stations 3a, to 3c, are connected to a cell 4a. The base station 2a, receives wireless quality information from the mobile station 3a, which is connected to the serving cell 4a. For example, the wireless quality information may include a CQI (channel quality indicator). For example, the wireless quality information may also include, as the strength of the received power from the serving cell 4a, and the strengths of the received powers from the surrounding cells 4b,, 4c, . . . , the RSRP (reference signal received power) of the serving cell 4a, and the RSRPs of the surrounding cells 4b,, 4c . . . .

The base station 2a, uses wireless quality information which is received from the mobile station 3a as the basis to calculate a predicted throughput $TP_{norm}$, in the case of not subtracting the interference powers from the surrounding cells 4b,, 4c, . . . from the received power. The predicted throughput $TP_{norm}$, is, for example, calculated by the following formula (1).

$$TP_{norm} = \log_2\left(1 + \frac{S}{N + \sum_{n=1}^{N_{cell}} I_n}\right) \quad (1)$$

In formula (1), S is the received power of the signal which is transmitted from the serving cell 4a, while N is thermal noise. For example, S and N may be calculated from the CQI and RSRP of the serving cell 4a. $I_n$, is the n-th largest interference power in the various interference powers from the surrounding cells and may be calculated based on the RSRPs of the surrounding cells 4b,, 4c, . . . . Further, the wireless quality information which is received from the mobile station 3a, includes the strength of the received powers of the interference powers which are received from the Ncell number of surrounding cells 4b,, 4c . . . .

The base station 2a, uses the wireless quality information which is received from the mobile station 3a as the basis to calculate the predicted throughput $TP_k$, in the case of no interference powers from the first to k-th largest interference surrounding cells. The predicted throughput $TP_k$, is, for example, calculated by the following formula (2).

$$TP_k = \log_2\left(1 + \frac{S}{N + \sum_{n=1}^{N_{cell}} I_n - \sum_{n=1}^{k} I_n}\right) \quad (2)$$

In the following explanation, the predicted throughput $TP_k$, in the case of no interference powers from the first to k-th largest interference surrounding cells will be indicated as the "first predicted throughput $TP_k$". The predicted throughput $TP_{norm}$, in the case of not subtracting the interferences from the surrounding cells 4b,, 4c, . . . from the received power will be indicated as the "second predicted throughput $TP_{norm}$".

Next, the base station 2a, judges if there is a natural number "k" which satisfies the condition of the following judgment formula (3). The function f(k) in the judgment formula (3) is a function of "k".

$$TP_k > f(k) \times TP_{norm} \quad (3)$$

The base station 2a, makes the serving cell 4a and the surrounding cells coordinate to transmit signals to the mobile station 3a, when there is a natural number "k" which satisfies the judgment formula (3). The surrounding cells which coordinate with the serving cell 4a, stop the transmission of signals in the same radio resources as the radio resources in which the serving cell 4a, transmits to the mobile station 3a. The base station 2a, does not make the serving cell 4a, and surrounding cells coordinate when there is no natural number "k" which satisfies the judgment formula (3). In this case, the surrounding cells may utilize the same radio resources as the radio resources in which the serving cell 4a, transmits a wireless signal to the mobile station 3a, for other communication.

When there is a natural number "k" which satisfies the judgment formula (3), the base station 2a selects the first to k-th largest interference surrounding cells as cells to coordinate with the serving cell 4a, which transmits the wireless signal to the mobile station 3a. In the following explanation, the cells which coordinate with the serving cell 4a, will sometimes be referred to as the "coordinating cells". Further, communication control by which the serving cell 4a, and the surrounding cells coordinate to transmit signals to the same mobile station will sometimes be referred to as the "coordinated control". Similarly, for other mobile stations 3b, and 3c, as well, it is judged if coordinated control may be used to transmit a signal from the serving cell 4a,, and the coordinating cells are selected.

From the definition of the formula (2), the first predicted throughput $TP_k$, is equal to the predicted value of the throughput when the serving cell 4a, and "k" number of coordinating cells coordinate. Therefore, permission for coordinated control is judged based on a comparison of the throughput in the case where the serving cell 4a, and coordinating cells coordinate and the threshold value "$f(k) \times TP_{norm}$".

Along with the increase in the number "k" of coordinating cells, the amount of the radio resources which are limited due to the coordinated control increases. For this reason, the function f(k) may also be made the increasing function of the number "k" of coordinating cells so that a higher first predicted throughput $TP_k$, is obtained the more the number "k" of coordinating cells increases.

For example, when "k" number of coordinating cells perform coordinated control, use of the radio resources at the coordinating cells as well as use of the radio resources at the serving cell 4a, is also stopped. Therefore, the coordinated control occupies (1+k) times the radio resources of the case of not performing coordinated control. Further, from the definition of the formula (1), prediction of the throughput when not performing coordinated control is obtained from the second predicted throughput $TP_{norm}$.

In one embodiment, an increasing function of "k" larger than (1+k) may be made the function f(k). As a result, coordinated control is performed when the first predicted throughput $TP_k$, is larger than (1+k) times the second predicted throughput $TP_{norm}$, and coordinated control is not performed when $TP_k \leq (1+k) \times TP_{norm}$.

The base station 2 uses the evaluation of the effect of improvement of the throughput which is caused when there is no interference from surrounding cells as the basis to judge permission for coordinated control and to select the coordinating cells. For this reason, it is possible to avoid coordinated control where the effect of improvement of throughput is not commensurate with the amount of radio resources occupied.

3. Functional Configuration of Embodiment

Figure 4:
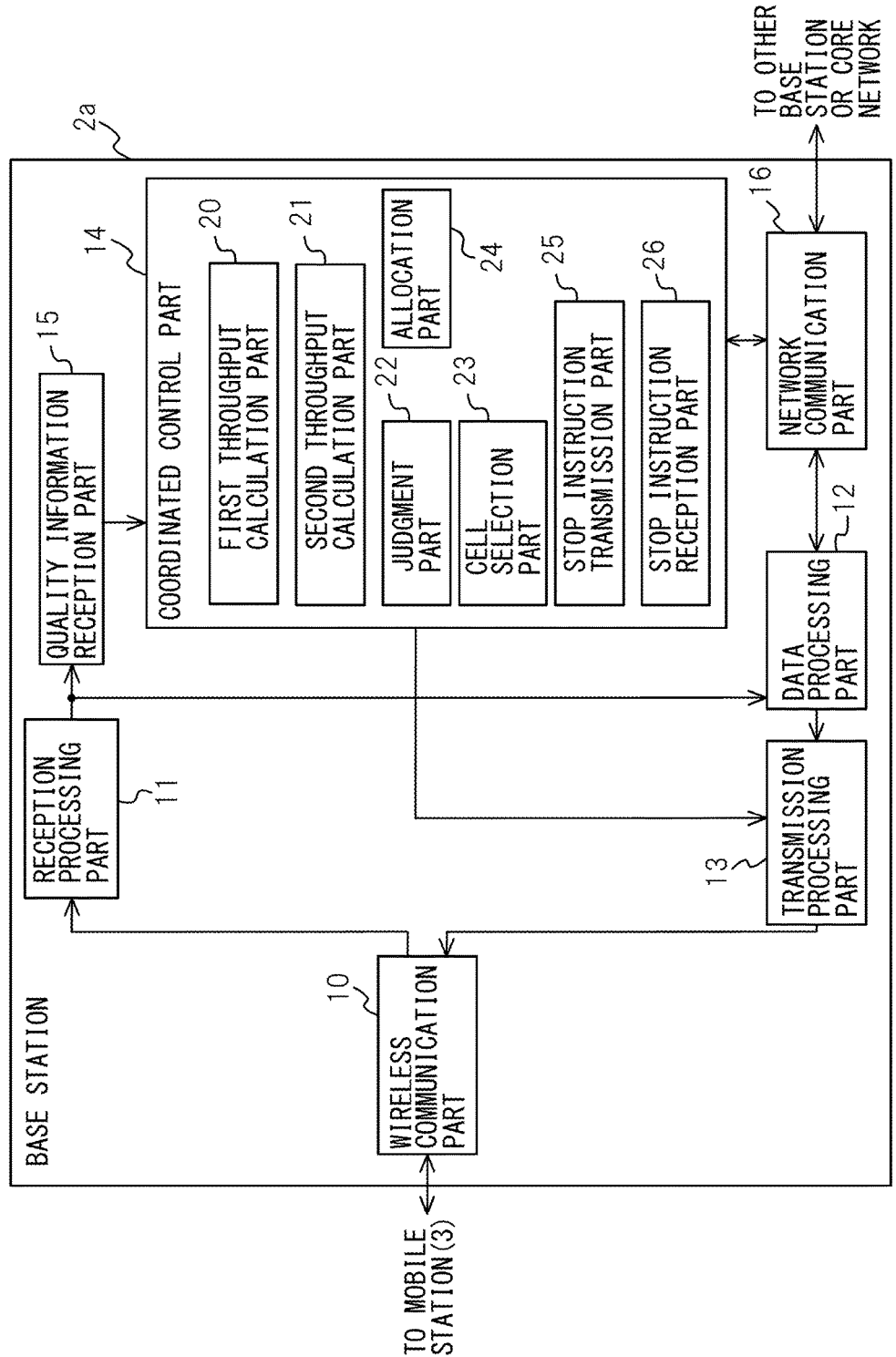
FIG. 4 is a functional diagram of one example of a base station apparatus.

FIG. 4 is a functional diagram of a first example of the base station 2a, which is used in the communication system 1. The structures of the other base stations 2b, and 2c may be similar to the base station 2a. The base station 2a, comprises a wireless communication part 10, reception processing part 11, data processing part 12, transmission processing part 13, coordinated control part 14, quality information reception part 15, and network communication part 16.

The wireless communication part 10 receives a wireless signal of the wireless band which is received by the antenna and converts it to a received signal of the baseband. The reception processing part 11 processes the received signal to demodulate and decode it. The received signal from a mobile station 3 in the area of the serving cell 4a, may contain user data and wireless quality information. The wireless quality information may be, for example, a measurement report which terminal equipment transmits in the 3GPP specifications. The measurement report includes the CQI and RSRP of the signal which is received from the serving cell 4a,, the RSRPs of the interference powers which are received from the surrounding cells, and identifiers of the respective cells.

The reception processing part 11 outputs the user data to the data processing part 12 and outputs the wireless quality information to the quality information reception part 15. The data processing part 12 transmits the user data to a higher apparatus which is connected to the core network. Further, the data processing part 12 receives user information from the higher apparatus. The data processing part 12 outputs downlink control information which includes allocation information of the uplink etc. and user data as the downlink signal to the transmission processing part 13.

The transmission processing part 13 receives the allocation information of the radio resources of the downlink which is allocated to a mobile station 3 from the coordinated control part 14. The transmission processing part 13 encodes and modulates the downlink signal which is received from the data processing part 12. The transmission processing part 13 generates a baseband signal on which the modulated downlink signal is mapped at the frequency band which the allocation information designates and outputs the baseband signal to the wireless communication part 10 at a transmission timing which the allocation information designates. The wireless communication part 10 converts the baseband signal to a signal of the wireless band, then transmits it through the antenna. The quality information reception part 15 inputs the wireless quality information which was input from the reception processing part 11 to the coordinated control part 14.

The coordinated control part 14 determines the radio resources which are allocated for downlink communication and uplink communication with the mobile station 3. The coordinated control part 14 outputs the allocation information of the radio resources of the downlink to the transmission processing part 13. The coordinated control part 14 uses the wireless quality information as the basis to judge whether to perform coordinated control between the serving cell 4a, and the surrounding cells 4b,, 4c, . . . when transmitting the downlink signal to the mobile station 3.

When performing coordinated control, the coordinated control part 14 generates a stop instruction signal which makes the coordinating cells stop the transmission in the radio resources in which a downlink signal is transmitted to the mobile station 3. The stop instruction signal may include designation information of the radio resources for which transmission is to be stopped and designation information of the coordinating cells. The coordinated control part 14 outputs the stop instruction signal to the network communication part 16.

The network communication part 16 performs processing for communication with other base stations 2a, 2c, . . . through wired connections 5 and processing for communication with the core network. When the network communication part 16 receives a stop instruction signal from the coordinated control part 14, the network communication part 16 transmits the stop instruction signal to the designated coordinating cells. Further, when the network communication part 16 receives stop instruction signals which designate the cell 4a, as a coordinating cell from the other base stations 2a,, 2c, . . . , the network communication part 16 outputs the stop instruction signals to the coordinated control part 14. The coordinated control part 14 stops the transmission of signals in the radio resources which are designated by the stop instruction signals.

The coordinated control part 14 is comprised of a first throughput calculation part 20, second throughput calculation part 21, judgment part 22, cell selection part 23, allocation part 24, stop instruction transmission part 25, and stop instruction reception part 26.

The first throughput calculation part 20 uses the wireless quality information which was received from the mobile station 3 to calculate the first predicted throughput $TP_k$, for each of the natural number k=1, to N number of cells. The second throughput calculation part 21 calculates the second predicted throughput $TP_{norm}$.

The judgment part 22 judges if there is a natural number "k" which satisfies the judgment formula (3). The judgment part 22 judges that the mobile station 3 is covered by transmission of a downlink signal by coordinated control when there is a natural number "k" which satisfies the judgment formula (3).

The cell selection part 23 selects the first to k-th magnitudes largest interference surrounding cells as the coordinating cells. When there are several natural numbers "k" which satisfy the judgment formula (3), the cell selection part 23 selects any one among these for the coordinating cells. For example, the cell selection part 23 may select the smallest number in the plurality of natural numbers "k" which satisfy the judgment formula (3). Further, for example, the cell selection part 23 may select the natural number "k" where the first predicted throughput $TP_k$, becomes the greatest.

The allocation part 24 allocates radio resources to the mobile station 3 which connects to the serving cell 4a. If the allocation part 24 receives a stop instruction signal which designates the cell 4a, as a coordinating cell, it stops the transmission of the signal by the radio resources which are designated by the stop instruction signal.

The stop instruction transmission part 25 generates a stop instruction signal which makes the coordinating cells stop transmission in the downlink radio resources which are allocated to the mobile station 3 which is covered by coordinated control. The stop instruction transmission part 25 transmits the stop instruction signal through the network communication part 16 to the coordinating cells. The stop instruction reception part 26 receives stop instruction signals from other base stations 2a,, 2c, . . . through the network communication part 16 and outputs them to the allocation part 24.

Figure 5:
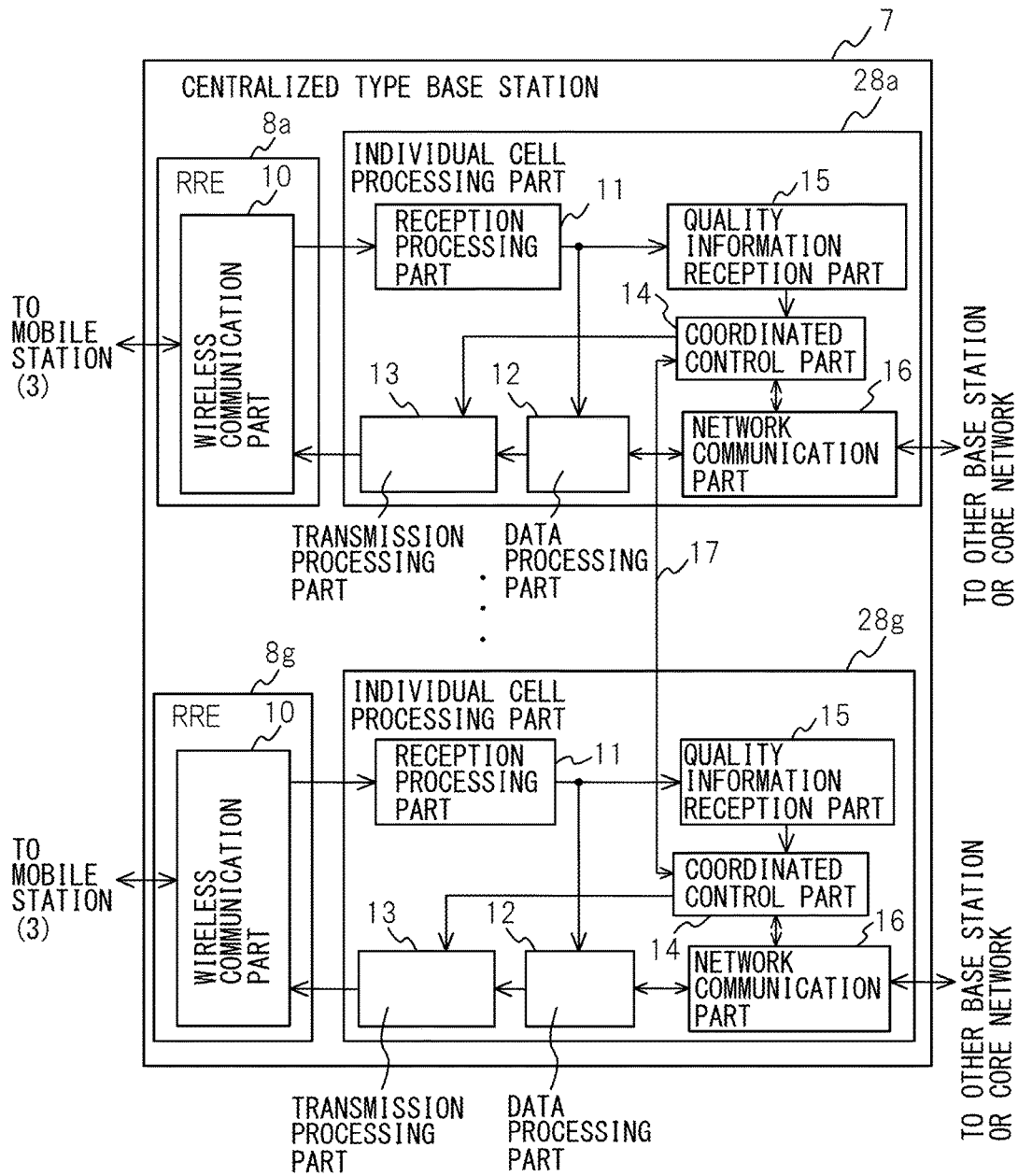
FIG. 5 is a functional diagram of a modification of the base station apparatus.

FIG. 5 is a functional diagram of a modification of the base station 2. FIG. 5 illustrates the functional configuration of the centralized type base station 7 and the RREs 8a, to 8g, when the cells are formed by RREs as illustrated in FIG. 3. The functions of the centralized type base station 7 may be divided into the individual cell processing parts 28a, to 28g, which perform the processing for the individual cells 4a, to 4g. The individual cell processing parts 28a, to 28g, and the RREs 8a, to 8g, will sometimes be referred to all together as the "individual cell processing parts 28" and "RREs 8".

Figure 6:
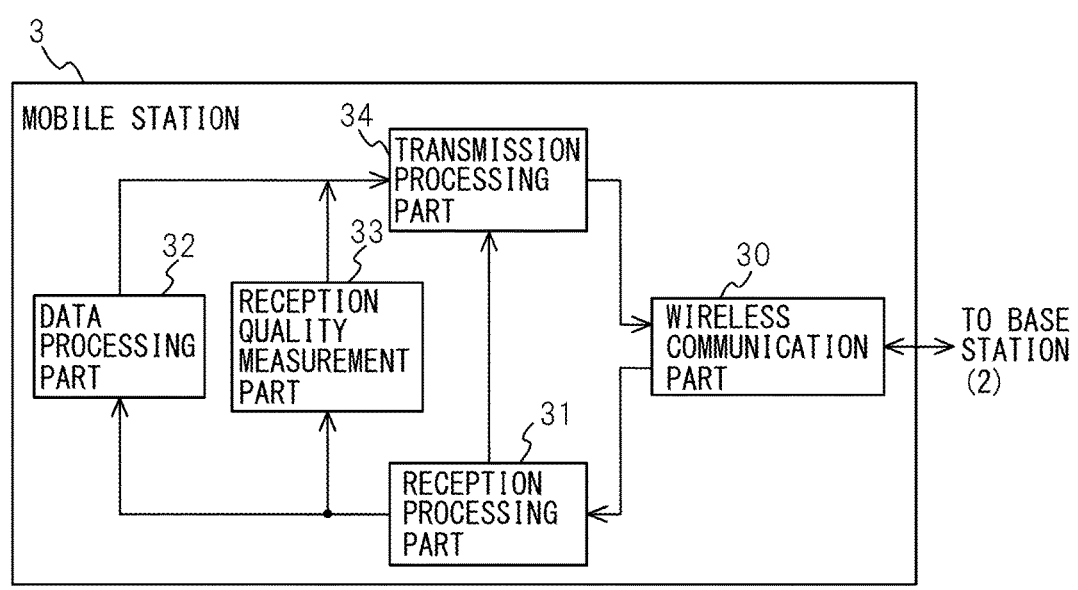
FIG. 6 is a functional diagram of one example of a mobile station apparatus.

Each individual cell processing part 28 may comprise the same component elements as the reception processing part 11, data processing part 12, transmission processing part 13, coordinated control part 14, quality information reception part 15, and network communication part 16 of the base station 2 which is illustrated in FIG. 6. The wireless communication part 10 of the base station 2 which is illustrated in FIG. 5 is provided at the RRE 8 side.

The stop instruction transmission part 25 and stop instruction reception part 26 of the coordinated control part 14 may send and receive a stop instruction signal through a base station circuit 17 when sending and receiving a stop instruction signal with the coordinated control part 14 of another individual cell processing part 28 which is provided at the same centralized type base station 7.

FIG. 6 is functional diagram of one example of the mobile station 3. The mobile station 3 comprises a wireless communication part 30, reception processing part 31, data processing part 32, reception quality measurement part 33, and transmission processing part 34. The wireless communication part 30 receives a wireless signal of the wireless band which is received by the antenna and converts it to a received signal of the baseband.

The reception processing part 31 processes the received signal to demodulate and decode it. The received signal from the base station 2 may include user data and a downlink control signal. The reception processing part 31 outputs the user data to the data processing part 32 and outputs the downlink control signal to the transmission processing part 34.

The data processing part 32 processes the application layer or other higher layer of the user data which is received from the reception processing part 31. Further, the data processing part 32 outputs the user data of the uplink which is generated by the processing of the higher layer to the transmission processing part 34.

The reception quality measurement part 33 measures the quality of reception at the mobile station 3 when the transmission signal from the base station 2 is received at the mobile station 3. The reception quality measurement part 33 generates wireless quality information which illustrates the measurement results and outputs it to the transmission processing part 34. As explained above, this wireless quality information may, for example, be the CQI, strength of received power from the serving cell $4a_,$, or strengths of the received powers from the surrounding cells $4b_,$, $4c,$ . . . The strength of the received power may, for example, be RSRP.

The transmission processing part 34 acquires the allocation information of the radio resources of the uplink which are allocated to the mobile station 3 from the downlink control signal. The transmission processing part 34 receives as the uplink signal from the data processing part 32 and reception quality measurement part 33 the user data and the wireless quality information. The transmission processing part 34 may receive wireless quality information in the form of for example a measurement report.

The transmission processing part 34 encodes and modulates the received user data and wireless quality information. The transmission processing part 34 generates a baseband signal on which the modulated uplink signal is mapped at the frequency band of the radio resources which the allocation information designates and outputs the baseband signal to the wireless communication part 10 at a transmission timing which the allocation information designates to the wireless communication part 10. The wireless communication part 30 converts the baseband signal to a wireless band signal, then transmits it through the antenna.

4. Explanation of Operation

Below, the operation of a base station 2 will be explained. In the following explanation, the number of mobile stations 3 which are connected to the serving cell 4a, is Nu. The wireless quality information which is received from a j-th (j=1, to Nu) mobile station 3 by the base station 2 envisions the case of inclusion of the strengths of received powers of interference powers which are received from $Ncell_j$, number of surrounding cells.

For the j-th (j=1, to Nu) mobile station 3, the first predicted throughput which is calculated by subtracting the interference powers from the first to k-th (k=1, to $Ncell_j$) largest interference surrounding cells is referred to as the "first predicted throughput $TP_{jk}$". The second predicted throughput which is calculated for the j-th (j=1, to Nu) mobile station 3 is referred to as as the "second predicted throughput $TP_{normj}$".

FIG. 7 is an explanatory view of a first example of the operation of the base station 2. The operation which is illustrated in FIG. 7 selects the coordinating cells so as to minimize the number of coordinating cells. The operation of FIG. 7 is, for example, performed periodically at predetermined intervals such as the scheduling period by the base station 2.

At the operation AA, the coordinated control part 14 enters the value "1" for the variable "j" which designates the mobile station 3 connected to the serving cell 4a. At the operation AB, the quality information reception part 15 receives the wireless quality information which is transmitted from the j-th mobile station 3 and outputs the wireless quality information to the coordinated control part 14.

At the operation AC, the second throughput calculation part 21 calculates the second predicted throughput $TP_{normj}$. At the operation AD, the coordinated control part 14 enters the value "1" in the variable "k". The variable "k" is a variable designating a surrounding cell. The strength of received power of interference power from the surrounding cell to the j-th mobile station 3 is reported in the wireless quality information. The variable "k" is used for designating the surrounding cell which gives the k-th largest interference power.

At the operation AE, the first throughput calculation part 20 calculates the first predicted throughput $TP_{jk}$. At the operation AF, the judgment part 22 judges if the variable "k" satisfies the judgment formula (3). If the variable "k" satisfies the judgment formula (3) (operation AF: Y), the operation proceeds to the operation AG. If the variable "k" does not satisfy the judgment formula (3) (operation AF: N), the operation proceeds to the operation AI.

At the operation AG, the judgment part 22 judges that the j-th mobile station 3 is covered by transmission of the downlink signal by coordinated control. At the operation AH, the cell selection part 23 selects the first to the k-th surrounding cells as the coordinating cells. After that, the operation proceeds to the operation AL.

At the operation AI, the coordinated control part 14 increases the value of the variable "k" by "1". At the operation AJ, the judgment part 22 judges if the value of the variable "k" is larger than the number of surrounding cells $Ncell_j$. If the value of the variable "k" is larger than the number of surrounding cells $Ncell_j$ (operation AJ: Y), the operation proceeds to the operation AK. If the value of the variable "k" is not larger than the number of surrounding cells $Ncell_j$ (operation AJ: N), the operation returns to the operation AE.

At the operation AK, the judgment part 22 judges that the j-th mobile station 3 is not covered by transmission of a downlink signal by coordinated control. After that, the operation proceeds to the operation AL.

At the operation AL, the coordinated control part 14 increases the value of the variable "j" by "1". At the operation AM, the judgment part 22 judges if the value of the variable "j" is larger than the number of mobile stations Nu. If the value of the variable "j" is larger than the number of mobile stations Nu (operation AL: Y), the operation proceeds to the operation AN. If the value of the variable "j" is not larger than the number of mobile stations Nu (operation AL: N), the operation returns to the operation AB.

At the operation AN, the stop instruction transmission part 25 generates a stop instruction signal which makes the related coordinating cells stop transmission in the downlink radio resources which are allocated to the mobile station 3 covered by coordinated control. The stop instruction transmission part 25 transmits the stop instruction signal. With the above, the operation is ended.

FIG. 8 is an explanatory view of a second example of the operation of a base station 2. The operation which is illustrated in FIG. 8 selects coordinating cells so as to make the first predicted throughput $TP_{jk}$, maximum. The operation of FIG. 8 is, for example, performed periodically at predetermined intervals such as the scheduling period by the base station 2.

At the operation BA, the coordinated control part 14 enters the value "1" for the variable "j". At the operation BB, the cell selection part 23 enters the value "0" for the variable $TP_{max}$, and enters the value "0" for the variable $k_{max}$.

At the operation BC, the quality information reception part 15 receives the wireless quality information which was transmitted from the j-th mobile station 3 and outputs the wireless quality information to the coordinated control part 14. At the operation BD, the second throughput calculation part 21 calculates the second predicted throughput $TP_{normj}$.

At the operation BE, the coordinated control part 14 enters the value "1" for the variable "k". At the operation BF, the first throughput calculation part 20 calculates the first predicted throughput $TP_{jk}$.

At the operation BG, the cell selection part 23 judges if the first predicted throughput $TP_{jk}$, which is calculated by the operation BF is larger than the value which is stored for the variable $TP_{max}$. If the first predicted throughput $TP_{jk}$, is larger than the value which is stored for the variable $TP_{max}$, (operation BG: Y), the operation proceeds to the operation BH. If the first predicted throughput $TP_{jk}$, is not larger than the value which is stored for the variable $TP_{max}$, (operation BG: N), the operation proceeds to the operation BI.

At the operation BH, the cell selection part 23 stores the value of the first predicted throughput $TP_{jk}$ for the variable $TP_{max}$, and stores the value of the variable "k" for the variable $k_{max}$. After that, the operation proceeds to the operation BI.

At the operation BI, the coordinated control part 14 increases the value of the variable "k" by "1". At the operation BJ, the cell selection part 23 judges if the value of the variable "k" is larger than the number of surrounding cells $Ncell_j$. If the value of the variable "k" is larger than the number of surrounding cells $Ncell_j$ (operation BJ: Y), the operation proceeds to the operation BK. If the value of the variable "k" is not larger than the number of surrounding cells $Ncell_j$ (operation BJ: N), the operation returns to the operation BF.

Due to the operations BE to BJ, the variable $TP_{max}$, stores the maximum value of the first predicted throughput $TP_{jk}$, while the variable $k_{max}$, stores the value of the variable "k" when the first predicted throughput $TP_{jk}$, becomes maximum.

At the operation BK, the judgment part 22 judges whether the value of the variable $k_{max}$, satisfies the judgment formula (3). When the value of the variable $k_{max}$, satisfies the judgment formula (3) (operation BK: Y), the operation proceeds to the operation BL. When the value of the variable $k_{max}$, does not satisfy the judgment formula (3) (operation BK: N), the operation proceeds to the operation BN.

At the operation BL, the judgment part 22 judges that the j-th mobile station 3 is covered by transmission of a downlink signal by coordinated control. At the operation BM, the cell selection part 23 selects the first to $k_{max}$-th cells as coordinating cells. After that, the operation proceeds to the operation BO.

At the operation BN, the operation judges that the j-th mobile station 3 is not covered by transmission of a downlink signal by coordinated control. After that, the operation proceeds to the operation BO. At the operation BO, the coordinated control part 14 makes the value of the variable "j" increase by "1". At the operation BP, the judgment part 22 judges if the value of the variable "j" is larger than the number of mobile stations Nu. If the value of the variable "j" is not larger than the number of mobile stations Nu (operation BP: N), the operation returns to the operation BB.

If the value of the variable "j" is larger than the number of mobile stations Nu (operation BP: Y), the operation proceeds to the operation BQ. At the operation BQ, the stop instruction transmission part 25 generates a stop instruction signal which makes related coordinating cells stop transmission in the downlink radio resources which are allocated to the mobile station 3 covered by the coordinated control. The stop instruction transmission part 25 transmits a stop instruction signal. With the above, the operation is ended.

5. Advantageous Effects of Embodiments

According to the apparatus or method disclosed in the embodiments, there is provided the art which, when making a plurality of cells coordinate for transmitting wireless signals to the same mobile station apparatus, uses the quality of communication which is expected by the coordination of the plurality of cells as the basis to judge permission for coordination and the number of coordinating cells.

The base station 2 predicts the throughput when subtracting interference from surrounding cells and judges whether coordinated control is permitted in accordance with the predicted result. As a result, it becomes possible to judge whether coordinated control is permitted based on the throughput which is expected from coordinated control. For example, it becomes possible to judge whether coordinate control is permitted based on judgment conditions which are determined in accordance with the amount of wireless resources occupied by the coordinated control and thereby avoid the coordinate control which does commensurate with the amount of occupation of radio resources.

FFR (fractional frequency reuse) limits the used frequency band at the cell end. However, in the present embodiment, the used frequency band is not necessarily limited at the cell edges for suppressing interference between cells. By not limiting the used frequency band, the present embodiment performs interference suppressing control with a stronger tolerance against frequency selective fading compared with FFR.

it is possible to decrease the amount of radio resources occupied by coordinated control by selecting the coordinating cells to minimize the number of coordinating cells. Further, by selecting the coordinating cells so as to maximum the first predicted throughput $TP_k$, it is possible to increase the effect of improvement of throughput due to coordinated control.

6. Hardware Configuration

Figure 9A:
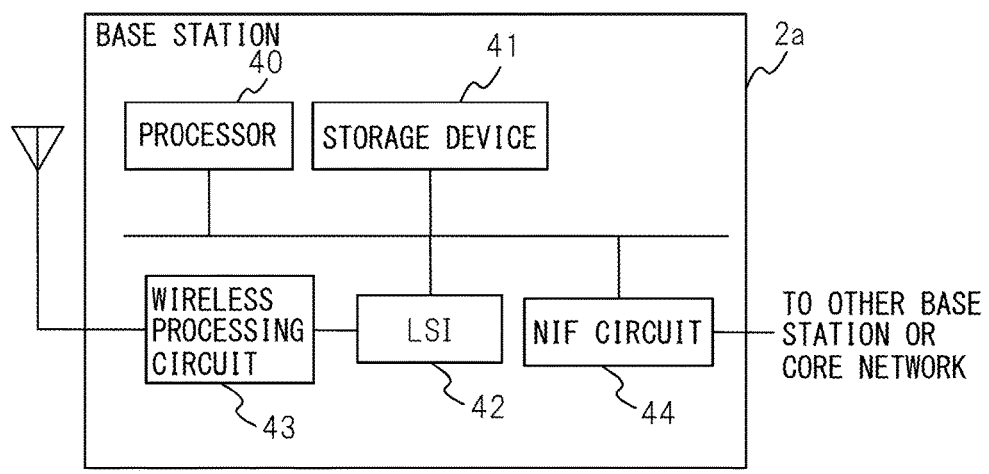

FIG. 9A is an explanatory view of an example of the hardware configuration of the base station 2a. The hardware configurations of the other base stations 2b, 2c, . . . may be similar to the hardware configuration of the base station 2a. The base station 2a, comprises a CPU (central processing unit), constituting a processor 40, a storage device 41, LSI (large scale integrated circuit) 42, wireless processing circuit 43, and network interface circuit 44. In the following explanation and attached drawings, the network interface will sometimes by indicated as "NIF".

The storage device 41 may include a device for storing computer programs or data such as a nonvolatile memory, read only memory (ROM), random access memory (RAM), hard disk drive. The processor 40 performs user management processing or operational control of the base station 2a, other than the processing which the LSI 42 performs in accordance with a computer program stored in the storage device 41.

The LSI 42 performs coding and modulation and demodulation and decoding of a signal which is transferred between the mobile station 3 and the base station 2a, communication protocol processing, and processing of the baseband signal relating to scheduling. The LSI 42 may include an FPGA (field-programming gate array), ASIC (application specific integrated circuit), DSP (digital signal processor).

The wireless processing circuit 43 may include a digital-analog conversion circuit, an analog-digital conversion circuit, a frequency conversion circuit, an amplification circuit, a filter circuit. The NIF circuit 44 is provided with electronic circuits for communicating through wired connections 5 and a core network using the physical layer and data link layer.

The operation of the wireless communication part 10 of the base station 2a, which is illustrated in FIG. 4 is performed by the wireless processing circuit 43. The operations of the reception processing part 11 and the transmission processing part 13 are performed by the LSI 42. The operations of the data processing part 12, coordinated control part 14, and quality information reception part 15 are performed by the processor 40. The operation of the network communication part 16 is performed by the NIF circuit 44.

Figure 9B:
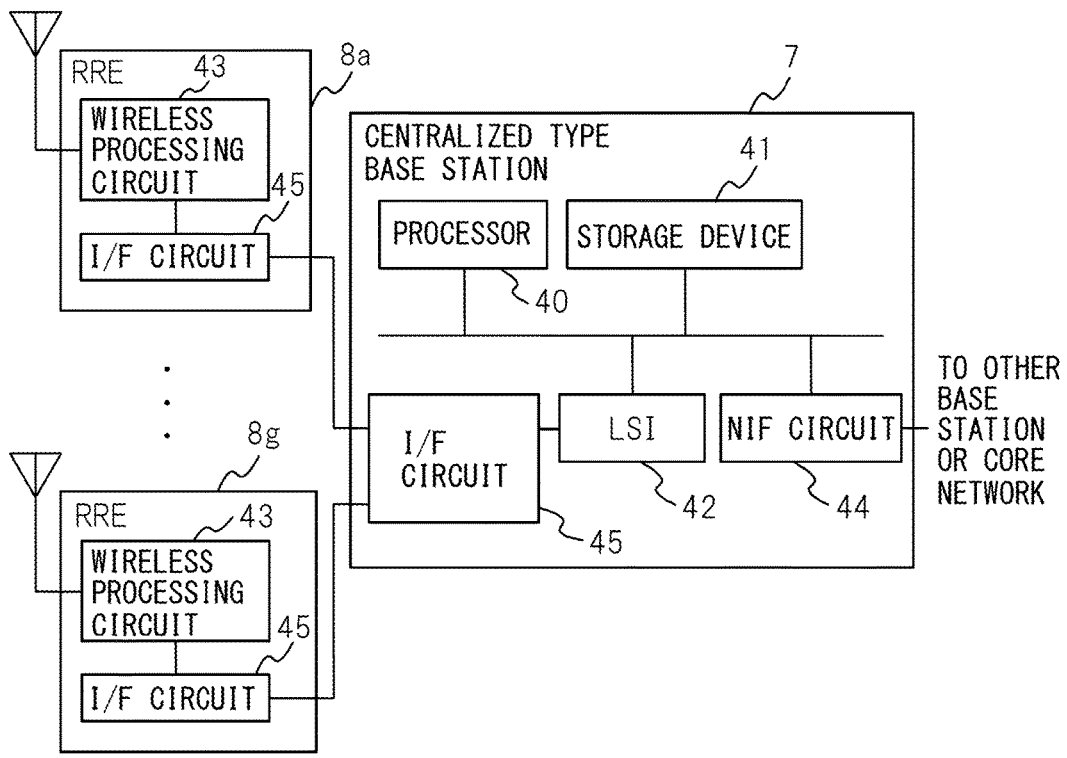
FIG. 9B is an explanatory view of a hardware configuration of a centralized type base station and RREs (remote radio equipments).

FIG. 9B is an explanatory view of the hardware configurations of the centralized type base station 7 and the RREs 8. The processor 40, storage device 41, LSI 42, and NIF circuit 44 are provided at the centralized type base station 7. The wireless processing circuits 43 are provided at all of the RREs 8a, to 8g. The centralized type base station 7 and the RREs 8a, to 8g, are provided with interface circuits 45 for connecting the centralized type base station 7 and the RREs 8a, to 8g. In the attached drawings, the interface is indicated as "I/F".

The centralized type base station 7 may be provided with an independent processor 40, storage device 41, LSI 42, and I/F circuit 45 for each individual cell processing part 28. The centralized type base station 7 may be provided with a common processor 40, storage device 41 and LSI 42 which operate as a plurality of individual cell processing parts 28.

The operations of the wireless communication parts 10 of the RREs 8a, to 8g, which are illustrated in FIG. 5 are performed by the wireless processing circuit 43. The operations of the reception processing part 11 and the transmission processing part 13 of the centralized type base station 7 are performed by the LSI 42. The operations of the data processing part 12, coordinated control part 14, and quality information reception part 15 are performed by the processor 40. The operation of the network communication part 16 is performed by the NIF circuit 44.

Figure 10:
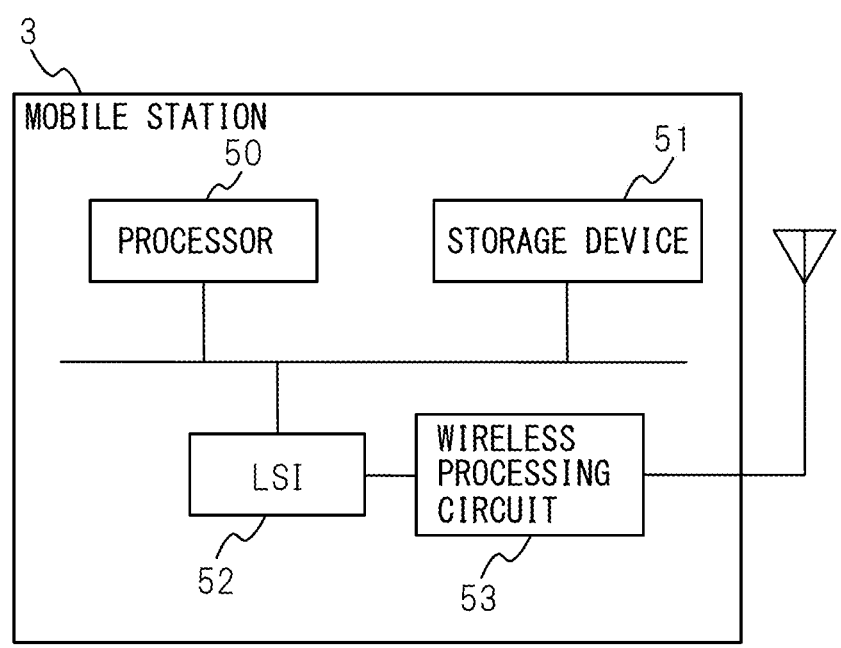
FIG. 10 is an explanatory view of one example of the hardware configuration of a mobile station apparatus.

FIG. 10 is a view which explains one example of the hardware configuration of the mobile station 3. The mobile station 3 comprises a processor 50, storage device 51, LSI 52, and wireless processing circuit 53. The storage device 51 may include a device for storing computer programs or data such as a nonvolatile memory, read only memory, random access memory.

The processor 50 performs operational control of the mobile station 3 other than the following processing which the LSI 52 performs and the application program which processes the user data in accordance with a computer program which is stored in the storage device 51.

The LSI 52 performs coding and modulation and demodulation and decoding of a signal which is transferred between the mobile station 3 and the base station 2, communication protocol processing, and processing of the baseband signal relating to scheduling. The LSI 52 may include an FPGA, ASIC, DSP. The wireless processing circuit 53 may include a digital-analog conversion circuit, an analog-digital conversion circuit, a frequency conversion circuit.

The operation of the wireless communication part 30 of the mobile station 3 which is illustrated in FIG. 6 is performed by the wireless processing circuit 53. The operations of the reception processing part 31 and the transmission processing part 34 are performed by the LSI 52. The operations of the data processing part 32 and the reception quality measurement part 33 are performed by the processor 50.

The hardware configurations which are illustrated in FIG. 9A, FIG. 9B, and FIG. 10 are merely examples for explaining the embodiments. So long as performing the operations, the base station, centralized type base station, RREs, and mobile stations which are described in this Description may be realized by employing any other hardware configurations.

The functional diagrams of FIG. 4 to FIG. 6 illustrate primarily the configuration relating to the functions which are explained in the Description. The base station 2a, centralized type base station 7, RREs 8, and mobile stations 3 may include other component elements other than the illustrated component elements. Further, the series of operations which are explained with reference to FIG. 7 and FIG. 8 may also be interpreted as a method including a plurality of procedures. In this case, "operation" may be read as "step".

All examples and conditional language recited hereinafter are intended for pedagogical purposes to aid the reader in understanding the principles of the invention and the concepts contributed by the inventor to furthering the art and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication control apparatus comprising:
a memory; and
a processor communicatively coupled to the memory, the processor configured to:
successively form a set of cells, the cells successively selected from surrounding cells in an order of magnitude of strengths of interference signals;
calculate a first predicted communication quality of a mobile station apparatus in a state not including an interference signal from the set of cells among the surrounding cells in accordance with measurement results of a quality of reception of a signal from a serving cell and strength of interference signals from the surrounding cells as measured by the mobile station apparatus; and judge permission for transmission of signals by the set of cells in a radio resource of communication of the mobile station apparatus based on the first predicted communication quality calculated for the set of cells.

2. The communication control apparatus according to claim 1, the processor further configured to:
calculate a second predicted communication quality of the mobile station apparatus in a state including the interference signal from the set of cells; and
judge permission for transmission of signals by the set of cells in the wireless resource of communication of the mobile station apparatus based on the first predicted communication quality and the second predicted communication quality.

3. The communication control apparatus according to claim 2, the processor further configured to:
judge permission for transmission of signals by the set of cells in the radio resource of communication of the mobile station apparatus based on a ratio of the first predicted communication quality to the second predicted communication quality.

4. The communication control apparatus according to claim 2, the processor further configured to:
judge permission for transmission of signals by the set of cells in the wireless resource of communication of the mobile station apparatus based on the first predicted communication quality, the second predicted communication quality, and a number of the set of cells.

5. The communication control apparatus according to claim 4, the processor further configured to:
judge permission for transmission of signals by the set of cells in the radio resource of communication of the mobile station apparatus based on the fact of whether the ratio of the first predicted communication quality to the second predicted communication quality is larger than an increasing function of the number of the set of cells.

6. The communication control apparatus according to claim 5, wherein the increasing function is a natural number of the number of the set of cells plus "1" or more.

7. The communication control apparatus according to claim 1, the processor further configured to:
select the set of cells having a minimum number of cells satisfying a judgment formula.

8. The communication control apparatus according to claim 1, the processor further configured to:
not stop transmission of the signals by the set of cells when the first predicted communication quality calculated for all combinations of a predetermined number or less of the set of cells selected from the surrounding cells does not satisfy a predetermined condition.

9. The communication control apparatus according to claim 1, the processor further configured to:
calculate the first predicted communication quality of the mobile station apparatus in the state not including interference signals from each of a plurality sets of cells including the set of cells among the surrounding cells; and
selects a set with a highest first predicted communication quality among the plurality of sets of cells.

10. A base station apparatus comprising:
a memory; and
a processor communicatively coupled to the memory, the processor configured to: successively form a set of cells, the cells successively selected from surrounding cells in an order of magnitude of strengths of interference signals;

calculate a predicted communication quality of a mobile station apparatus in a state not including interference signal from the set of cells among the surrounding cells in accordance with measurement results of a quality of reception of a signal from a serving cell formed by the base station apparatus and strength of interference signals from the surrounding cells as measured by a mobile station apparatus and;

judge permission for transmission of signals by the set of cells in a radio resource of communication of the mobile station apparatus from the serving cell based on the predicted communication quality calculated for the set of cells.

11. A communication control method comprising:

successively forming a set of cells, the cells successively selected from surrounding cells in an order of magnitude of strengths of interference signals;

calculating, by a processor, a predicted communication quality of a mobile station apparatus in a state not including interference signal from the set of cells among the surrounding cells in accordance with measurement results of a quality of reception of a signal from a serving cell and strength of interference signals from the surrounding cells as measured by the mobile station apparatus; and judging permission for transmission of signals by the set of cells in a radio resource of communication from the serving cell to the mobile station apparatus based on the predicted communication quality calculated for the set of cells.

* * * * *